United States Patent
Lim et al.

(10) Patent No.: US 8,337,143 B2
(45) Date of Patent: Dec. 25, 2012

(54) ACTUATOR IN TURBOCHARGER OF VEHICLE AND METHOD FOR CONTROLLING THE SAME

(75) Inventors: Chang Sik Lim, Icheon-si (KR); Seok Ryul Park, Cheongwon (KR); Sung Jong Yoon, Eumseong-gun (KR); Sung Dong Chang, Suwon-si (KR); Chae Hong Lim, Jincheon (KR); Tae Wan Kim, Cheongwon (KR)

(73) Assignee: Kamtec Inc., Iwol-Myeon (KR)

( * ) Notice: Subject to any disclaimer, the term of this patent is extended or adjusted under 35 U.S.C. 154(b) by 554 days.

(21) Appl. No.: 12/622,232

(22) Filed: Nov. 19, 2009

(65) Prior Publication Data

US 2010/0124488 A1 May 20, 2010

(30) Foreign Application Priority Data

Nov. 20, 2008 (KR) .................. 10-2008-0115741

(51) Int. Cl.
*F04D 27/00* (2006.01)
(52) U.S. Cl. ................ 415/118; 415/1; 60/602
(58) Field of Classification Search .............. 60/602; 415/51, 118, 160, 1; 700/289; 417/407
See application file for complete search history.

(56) References Cited

U.S. PATENT DOCUMENTS

| 5,123,246 A * | 6/1992 | Younessi et al. ............... 60/602 |
| 6,895,751 B1 * | 5/2005 | Greentree ...................... 60/602 |
| 2002/0029772 A1 * | 3/2002 | Isaac et al. ..................... 123/564 |
| 2005/0007058 A1 * | 1/2005 | Iwashita et al. ............... 318/599 |
| 2006/0021345 A1 * | 2/2006 | Mc Donald ..................... 60/602 |

FOREIGN PATENT DOCUMENTS

| JP | 9-233889 | * | 9/1997 |
| JP | 2006-070781 | * | 3/2006 |

OTHER PUBLICATIONS

Ishida et al., Method and Device for controlling induction Motor, Sep. 5, 1997, JP9-233889 Abstract.*
Narita et al., Failure Diagnostic Device for Actuator, Mar. 16, 2006, JP2006-070781 Abstract.*

* cited by examiner

*Primary Examiner* — Ninh H Nguyen
*Assistant Examiner* — Liam McDowell
(74) *Attorney, Agent, or Firm* — Maschoff Gilmore & Israelsen

(57) ABSTRACT

Actuator in a turbocharger of a vehicle and method for controlling the same is disclosed, in which a position of a vane is followed up in controlling a PWM signal to be applied to a motor according to time for preventing an overcurrent from flowing to the motor connected to the vane of the turbocharger.

9 Claims, 5 Drawing Sheets

ACTUATOR IN TURBOCHARGER OF VEHICLE AND METHOD FOR CONTROLLING THE SAME

CROSS REFERENCE TO RELATED APPLICATION

This application claims the benefit of the Patent Korean Application No. 10-2008-0115741, filed on Nov. 20, 2008, which is hereby incorporated by reference as if fully set forth herein.

BACKGROUND OF THE DISCLOSURE

1. Field of the Disclosure

The present invention relates to an actuator in a turbocharger of a vehicle for preventing a motor which operates vane of the turbocharger in the vehicle from burning due to an over-current and consequential malfunction; and a method for controlling the same.

2. Discussion of the Related Art

The turbocharger in a diesel engine vehicle has a gas turbine run by exhaust gas to operate a compressor directly connected thereto for compressing air that is pushed into the diesel engine to improve an engine output.

The turbocharger is provided with the vane set to a reference air flow rate to be introduced thereto, and driven by a shaft connected to the motor.

The motor, controlled by a control signal from an engine ECU, is susceptible to burning and consequential damage if a current to the motor increases over an allowable limit of the motor to apply an over-current to the motor.

The application of the over-current to the motor causes unstable operation of the turbocharger, failing to supply an adequate rate of air required for operation of the diesel engine.

SUMMARY OF THE DISCLOSURE

Accordingly, the present invention is directed to an actuator in a turbocharger of a vehicle and a method for controlling the same.

An object of the present invention is to provide an actuator in a turbocharger of a vehicle and a method for controlling the same, which enables normal operation of a turbocharger vane.

Another object of the present invention is to provide an actuator in a turbocharger of a vehicle and a method for controlling the same which can prevent a motor of the actuator in a turbocharger from burning and malfunction by an over-current.

Further object of the present invention is to provide an actuator in a turbocharger of a vehicle and a method for controlling the same which can make accurate position control of vane in the turbocharger.

Still further object of the present invention is to provide an actuator in a turbocharger of a vehicle and a method for controlling the same which can make stable cutting off of an overcurrent without additional circuit for cutting off the over-current.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electronic actuator in a turbocharger of a vehicle includes an electronic control unit provided to the vehicle, a microcomputer for controlling operation of a vane of the turbocharger according to a PWM (Pulse Width Modulation) signal from the electronic control unit, and an actuator unit having a motor of which operation is controlled by the PWM signal from the microcomputer, wherein the microcomputer forwards PWM signals different from one another to the motor for controlling an overcurrent.

The microcomputer includes a variable duty control unit for varying the PWM signal and forwarding the PWM signal varied thus to the motor unit, and a fixed duty control unit for forwarding the PWM signal fixed with respect to time.

The actuator unit includes a position sensor for sensing a position of the vane.

In another aspect of the present invention, a method for controlling an electronic actuator in a turbocharger of a vehicle includes a target signal forwarding step for an electronic control unit to forward a PWM signal on a target position of a vane for making the vane of the actuator in the turbocharger to position to the target position, a vane position determining step for determining whether the vane is positioned at the target position or not at the present time, and a signal control step for determining that the present state is a normal state if the vane is positioned at the target position, and if the vane fails to position at the target position, controlling the PWM signal being forwarded to the motor according to time.

The signal control step includes the step of following up the present position of the vane and applying a current corresponding to a target signal (PWM) is applied to the motor.

The first control step includes the step of applying an increased current to the motor for a t1 time period.

The first control step further includes an overcurrent control step for controlling the overcurrent to prevent the overcurrent from being applied to the motor.

The overcurrent control step includes a second control step for decreasing the current being applied to the motor for a t2 time period, and a third control step for increasing the current being applied to the motor for a t3 time period additionally after the second control step.

The current applied in the second control step is decreased from the current applied in the first control step.

A current higher than the current applied in the second control step is applied in the third control step.

A current fixed with respect to time is applied to the motor in the second control step and the third control step.

In the second control step, a current, which can maintain the present opening of the vane, is kept applied.

The second and third control steps are repeated after the first control step in an order only when the vane fails to position at the target position.

The current applying time periods in the signal control steps are in an order to t2>t1>t3.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
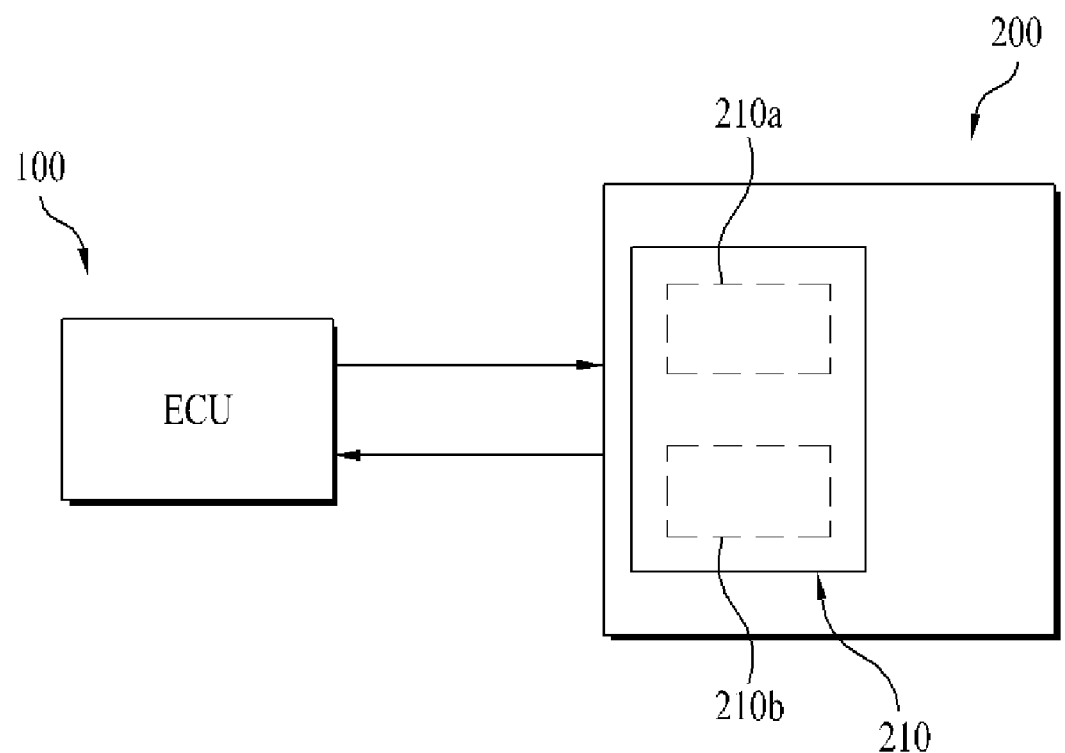
FIG. 1 illustrates a block diagram showing signal transmission/reception between an electronic actuator in a turbocharger of a vehicle and an electronic control unit of the vehicle in accordance with a preferred embodiment of the present invention, schematically.
Figure 2:
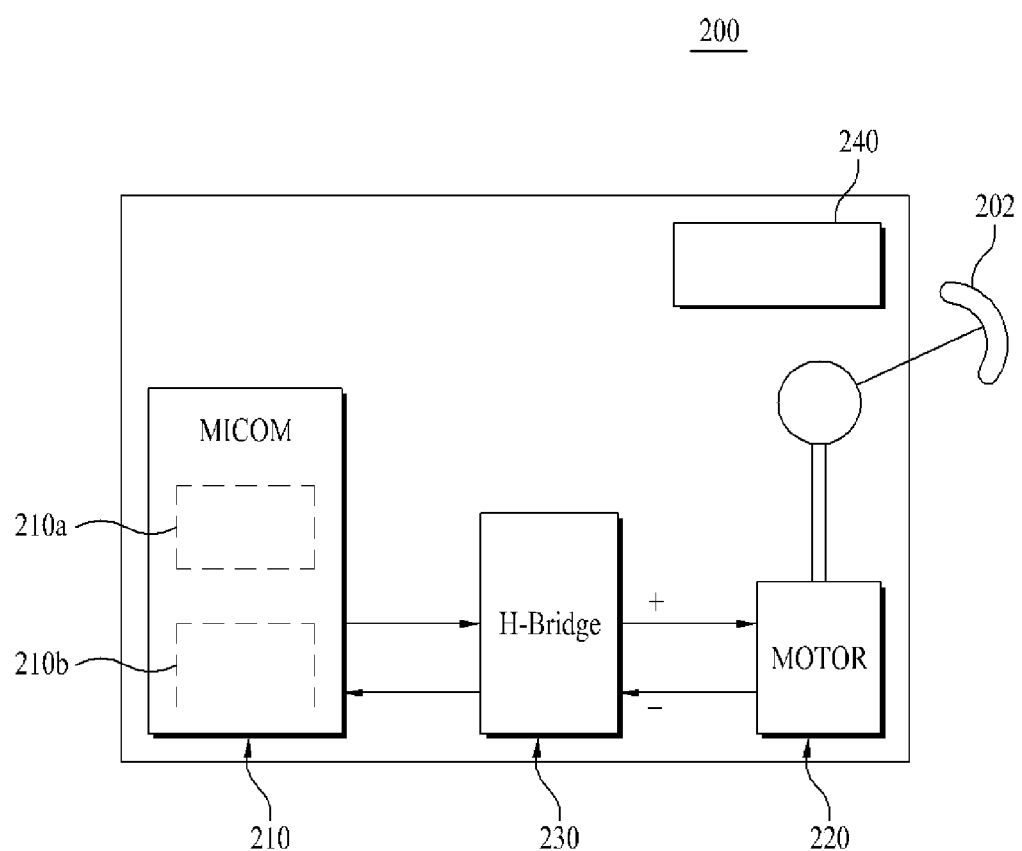
FIG. 2 illustrates a block diagram of an electronic actuator in a turbocharger of a vehicle in accordance with a preferred embodiment of the present invention.

Referring to FIGS. 1 and 2, the actuator in a turbocharger of a vehicle relates to a vane actuator in a turbocharger of a diesel vehicle having a turbocharger, wherein the actuator includes a motor, and all peripheral components provided between the motor and the vane. The actuator is operated, electronically.

The vehicle has an electronic control unit ECU 100 for controlling general matters required for operation and running of the vehicle.

The electronic control unit 100 forwards a PWM signal on a target position of an actuator unit 200 to be described later to a microcomputer 210 in the actuator unit 200, and the microcomputer 210 forwards an operating signal to the motor 220 according to the PWM signal received thus. That is, the signal from the electronic control unit 100 to the microcomputer 210 is a signal on a target position of the vane 202, the signal from the microcomputer 210 to the motor 220 is a motor control signal.

The actuator unit 200 includes the microcomputer 210 MICOM, the motor 220, an H-bridge circuit 230, a position sensor 240 and vane 202.

The microcomputer 210 receives the PWM signal having a duty ratio from the electronic control unit 100, and forwards the PWM signal to the H-bridge circuit 230 to make the motor 220 to operate. The microcomputer 210 also receives a position signal of the vane 202 from the position sensor, and forwards the position signal to the electronic control unit 100.

The motor 220 has a motor shaft, and the vane 202 are connected to the motor shaft or a connection shaft (not shown) connected to the motor shaft.

The H-bridge circuit 230 corresponds to a switch for applying a current to the motor 220 according to the PWM signal from the microcomputer 210.

The position sensor 240 is a sensor for sensing an opening amount change of the vane 202 by a magnetic force change, a hall sensor is used as the position sensor 240.

The hall sensor has a magnet for generating a magnetic force, so that the hall sensor senses a magnetic flux density produced according to an extent of the magnet coming close or moving away from the hall sensor at the time the motor is operated and forwards to the microcomputer 210.

The microcomputer 210 forwards the magnetic flux density to the electronic control unit 100, and the electronic control unit 100 calculates information on the present position to determine whether the present position is the target position or not, and forwards a control command proper to the present position of the vane 202.

Since the vane 202 is an element of the turbocharger, detailed description of the vane 202 will be omitted.

The PWM signal forwarded from the electronic control unit 100 to the microcomputer 210 is fed back to the electronic control unit 100 from the microcomputer 210 in real time.

The microcomputer 210 controls the PWM signal to be applied to the motor 210 so that no overcurrent flows to the motor 220. Detailed description of this will be given, later.

The microcomputer 210 includes a variable duty control unit 210a for varying the PWM signal according to time and forwarding the PWM signal varied thus to the motor 220 and a fixed duty control unit 210b for forwarding the PWM signal fixed with respect to time to the motor unit.

Figure 3:
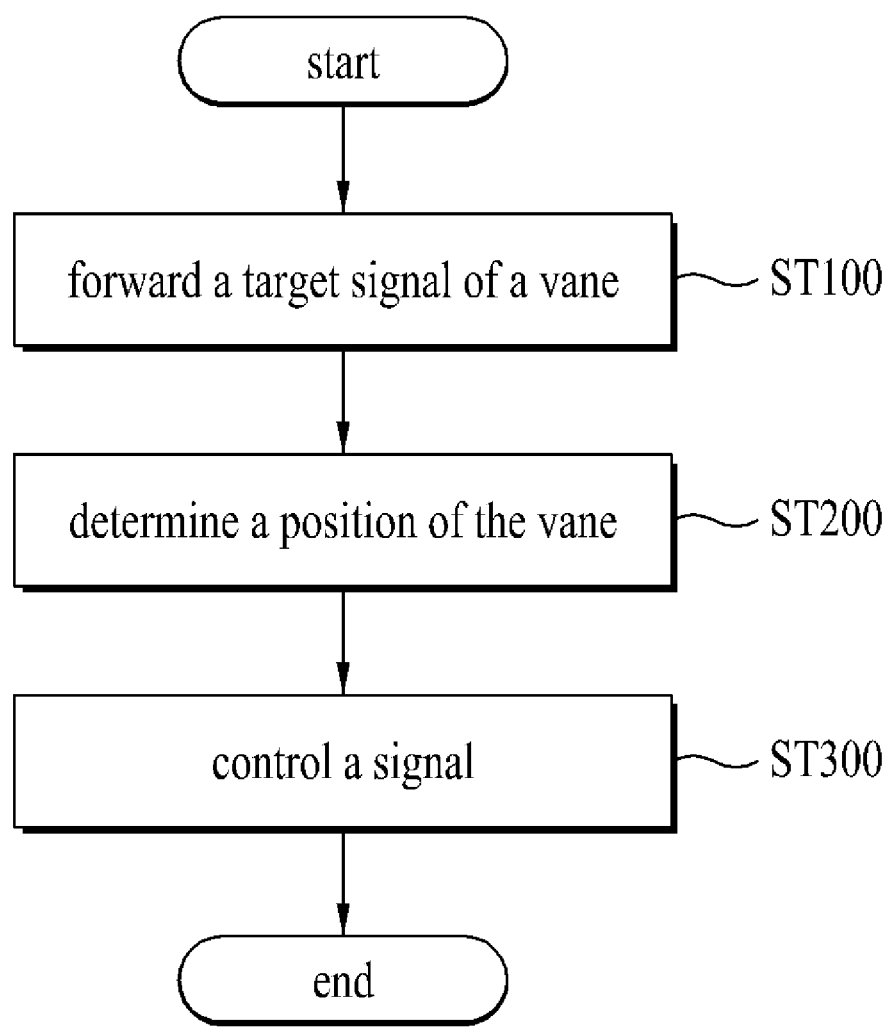
FIG. 3 illustrates a flow chart showing the steps of a method for controlling an electronic actuator in a turbocharger in accordance with a preferred embodiment of the present invention.
Figure 4:
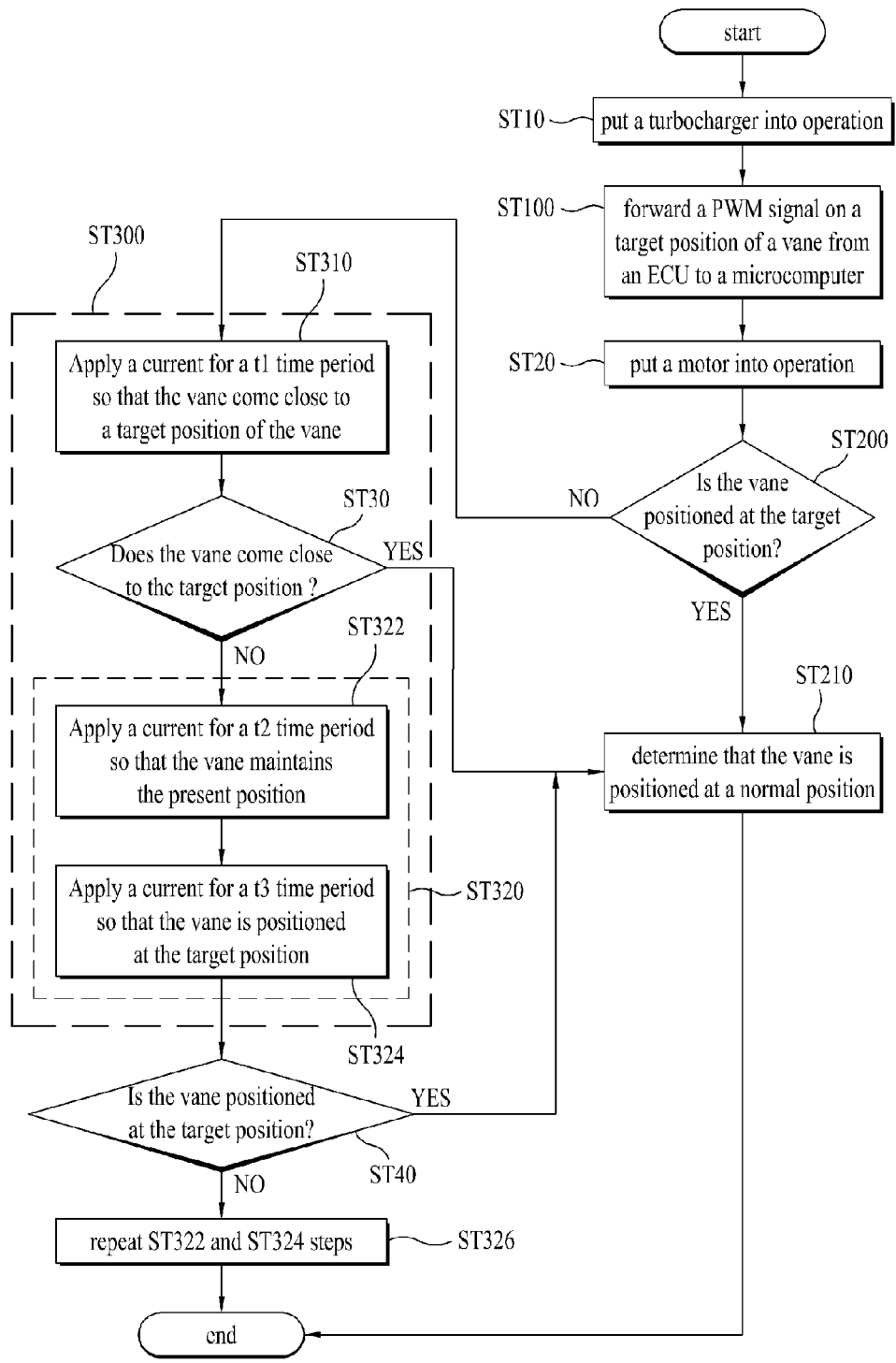
FIG. 4 illustrates a flow chart showing operating states in a method for controlling an electronic actuator in a turbocharger in accordance with a preferred embodiment of the present invention.

Referring to FIGS. 3 and 4, a method for controlling an electronic actuator in a turbocharger includes a target signal forwarding step ST100 for an electronic control unit forwarding a PWM signal on a target position of vane to make the vane at the target position, a vane position determining step ST200 for determining whether the vane are positioned at the target position presently or not, and a signal control step ST300 for determining the preset state as a normal state if the vane is positioned at the target position, and controlling the PWM signal forwarded to a motor according to time, if the vane is failed to positioned at the target position.

The signal control step ST300 includes a first step for following up the present position of the vane and applying a current corresponding to the target signal PWM to the motor.

In the first step ST310, the current is applied to the motor in an increased state for a t1 time period.

Because, since the present position of the vane is not the target position of the vane, a current increased more than the current supplied to the motor presently is required to be supplied for making the vane to move to the target position.

For an example, if the present PWM duty ratio is 76% while the duty ratio of the PWM signal corresponding to the target position of the vane is 78%, i.e., the current is being applied to the motor in a state the present PWM duty ratio is 2% lower than the target PWM duty ratio, the PWM duty ratio being forwarded to the motor is changed so as to be close to, or the same with, the PWM duty ratio corresponding to the target position of the vane for operating the motor.

The t1 time period is a time period required for the vane to follow up the target position.

The signal control step ST300 includes an overcurrent controlling step ST320 for preventing the overcurrent from being applied to the motor.

The overcurrent controlling step ST320 includes a second control step ST322 for reducing the current being applied to the motor for a t2 time period, and a third control step ST324 for increasing the current being applied to the motor for a t3 time period additionally after the second control step ST322.

The current applied at the second control step ST322 is a current reduced from the current applied in the first control step ST310.

Because, if the current is kept applied to the motor in a state of the first control step ST310, a current allowable to the motor will be applied to the motor, causing burning of the motor due to the overcurrent.

Though no specific figure of a reduced value of the current at the time of changing from the first control step ST310 to the second control step ST322 will be given, it is made to supply a current lower than a current at the time the overcurrent takes place at the motor to the motor.

In the third control step ST324, a current higher than the current applied in the second control step ST322 is applied to the motor.

Because, in order to maintain the duty ratio corresponding to the target position of the vane in a state the t2 time period is passed, it is required to apply a current corresponding to the duty ratio of the target position to the vane for positioning the vane to the target position.

In the second control step ST322 and the third control step ST324, a fixed current according to time is applied to the motor.

After the first step ST310 in which the duty ratio is increased, the second and third control steps ST322 and ST324 are steps in which the duty ratio is adjusted for the target position of the vane additionally, when the microcomputer 200 receives a state of duty ratio change for forwarding the PWM signal to the motor, which is the closest to the target duty ratio.

In the second control step ST322, a current is kept applied, which can maintain the present amount of vane opening.

Because, since the current is reduced just before the overcurrent is applied to the motor, and the current is applied to the motor for the t2 time period, there is no problem in operation of the turbocharger even if a current enough to maintain the present amount of opening of the vane is applied, rather than precise adjustment of the target position of the vane, the above fixed current is applied.

The second and third control steps ST322 and ST324 repeated after the first control step ST310 in an order.

Because correction of the target position of the vane is carried out, not once in the first control step ST310, but repeatedly in the second and third control steps ST322 and ST324 while the microcomputer 210 keeps checking the present position of the vane and the current applied to the motor for making the vane in operation at the target position and preventing the overcurrent from being supplied to the motor.

Time periods of the current in the signal control step ST300 are in an order of t2>t1>t3.

The t2 time period of the second control step ST322 is the longest because, after the current is supplied to the motor close to an allowable limit of the motor while the current is applied for the t1 time period in the first control step ST310, the current supplied to the motor in the second control step ST322 is decreased for cooling down the motor overheated in a particular time period t2.

Preferred embodiments of the actuator in a turbocharger of a vehicle and a method for controlling the same of the present invention will be described with reference to the attached drawings.

Figure 5:
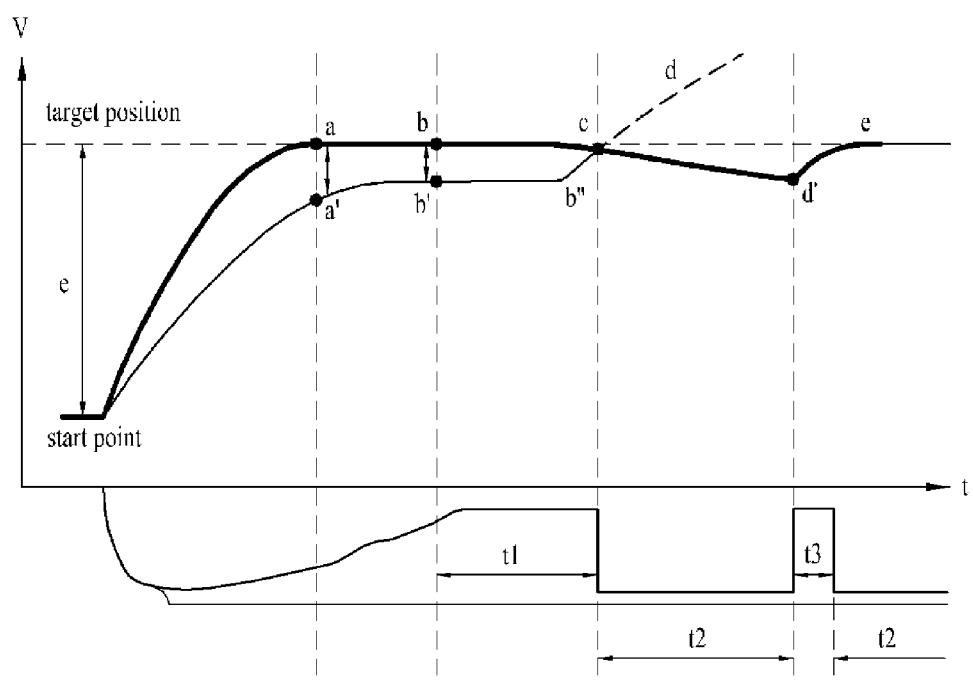
FIG. 5 illustrates a graph showing a voltage versus time of an electronic actuator in a turbocharger in accordance with a preferred embodiment of the present invention.

Referring to FIGS. 4 and 5, as a vehicle having a turbocharger mounted thereto runs, exhaust gas from an exhaust manifold is supplied to a turbine and rotates blades of the turbine at a fast speed (ST310).

Then, a compressor connected to the turbine with the same shaft compresses and supplies the air drawn from an outside of the vehicle to an engine.

The electronic control unit 100 forwards a PWM signal so that the vane 202 at the microcomputer 202 positions at a target position (ST100).

The microcomputer 210 forwards the PWM signal from a variable duty control unit 210*a* to an H-bridge circuit 230, and the H-bridge circuit 230 forwards the PWM signal having a duty ratio by switching of itself.

The motor 220 rotates the motor shaft according to the PWM signal from the microcomputer 210, to rotate a connection shaft connected to the motor shaft for moving the vane to the target position(ST20).

As the motor operates, the position of the vane 202 is sensed by a position sensor 240, and forwarded to the microcomputer 210, and the electronic control unit 100 has a signal on a present PWM position of the vane 202 fed back from the microcomputer 210.

The electronic control unit 100 analyzes the PWM signal from the actuator unit 200 and the PWM signal fed back to the electronic control unit 100 from the microcomputer 210, to have information on the present position of the vane in real time.

The position sensor 240 determines the present position of the vane 202 by sensing a magnetic flux density produced by a magnet with a hall sensor.

For an example, a section of moving locus of the vane 202 are set and the section is sub-divided, and by making the microcomputer 210 to memory magnetic flux densities varied with the sub-section positions of the vane 202, the microcomputer 210 can detect the present position of the vane 202 according to the magnetic flux density, accurately.

The microcomputer 210 senses whether the vane 202 is at the target position or not with the position sensor 240 and determines the present position (ST200).

If the vane 202 is at a normal position, the motor 220 is operated normally by the microcomputer 210, and determining that the vane 202 is also at the target position ST210, what is required is keeping monitoring of sensing of the position of the vane 202.

If the vane 202 fails to reaches to the target position presently, the microcomputer 210 checks the PWM signal on the present position of the vane 202 with the position sensor 240, and determines the PWM signal on the target position, to determine a difference between the PWM signals. The difference between the PWM signal on the present position and the PWM signal on the target position is an error, taking place at the vane 202 (See FIG. 5).

Referring to FIGS. 4 and 5, an X-axis denotes time and Y-axis denotes a voltage V. A thick solid line denotes a graph showing a target position of the vane 202 according to a moving locus, and a thin solid line denotes a graph showing an actual moving locus of the vane 202.

Under the graph showing a target position of the vane 202, variation of the voltage produced as the motor is controlled by the microcomputer is shown in a solid line.

In FIG. 5, the target and actual loci of the vane are moved according to a voltage state. Since voltage (V)=current (I)*resistance (R), the voltage V is a state of variation of the current (I), and the resistance (R) corresponds to the motor 220.

Preferably, the voltage change according to a position change of the vane 202 has a locus of the thick solid line starting from a start point moving to a b position through an a position, which is a target moving locus of the vane.

However, when the vane 202 actually moves by the rotation force of the motor, the vane 202 has a moving locus of a thin solid line starting from a start point moving to a b' position through an a' position.

Therefore, an error e corresponding to a vertical distance between an a~b line and a a'~b' line takes place between the target locus and the actual locus of the vane. The error is a positional error caused as the vane 202 fails to position properly, and the microcomputer 210 changes the PWM signal to be forwarded to the motor for adjusting the positional error of the vane 202.

As the positional error of the vane takes place, the microcomputer 210 forwards the PWM signal to the motor for a t1 time period for positioning the vane 202 at the target position.

In this instance, the time t1 is a time period required for the vane 202 to follow up the target position at the present state, and, in an actual operation of the vane 202, the time t1 denotes a state in which the vane 202 fails to move to the target position (normal position) due to an external load or disturbance.

For this, the electronic control unit 100 forwards the PWM signal for the vane 202 to follow up the target position, and the microcomputer 210 performs control so that an increased current is applied to the motor 220 for a preset time period t1 (ST310).

As shown in the section of the t1, the current to the motor increases slowly until the current comes close to the allowable current of the motor.

If the current is applied in above state, the locus of the vane rises from b' to c' via b''. The c position corresponds to the target position of the vane.

For the first time, as the current to the motor increases for t1 time period, the motor 220 is driven more for a time period corresponding to the increased current, moving the vane 202 to the target position.

The increased current is applied only for the t1 time period, because, if the microcomputer 210 keeps applying the increased current to the motor exceeding the t1 time period, an overcurrent exceeding the allowable value of the motor will be applied to the motor, the voltage applied to the motor moves from c position to d position (a portion in a dashed line) to cause burning and damage to the motor.

The microcomputer 210 receives information on the present position from the position sensor 240 for noticing an accurate present position of the vane 202.

If the vane 202 is close to the target position of the vane 202, the microcomputer 210 forwards the PWM signal to the motor such that a current is applied to the motor for the t2 time period, which is decreased from the current applied to the motor through the fixed duty control unit 210b for the t1 time period (ST322).

The being applied to the motor is decreased thus for preventing the motor from burning, as well as cooling down the motor operated up to right before an overcurrent state for the t2 time period.

In this case the locus of the vane moves from c position to d' position. The d' position corresponds to a position close to the target position of the vane.

The microcomputer 210 receives information on the present position of the vane of the d' position from the position sensor 240, and compares to the target position of the vane. If the microcomputer 210 determines that the present position of the vane 202 is close to the target position of the vane, the microcomputer 210 applies a current which is increased from the current applied to the motor for the t2 time period to the motor for a t3 time period (ST324) to make the vane to follow up the target position.

Then, the motor is rotated additionally by the current applied for the t3 time period, moving the vane 202 to the target position. Accordingly, the moving locus of the vane moves from d' position to e position.

The microcomputer 210 receives information on the present position of the vane 202 from the position sensor 240, and checks if the vane is positioned properly once more ST40. The microcomputer 210 determines that the vane is positioned properly if the vane 202 is positioned at the e position (ST210).

If the vane 202 fails to position at the normal position, the microcomputer 210 keeps additionally applying the current for the t2 and t3 time periods repeatedly after applying the current to the motor for the t3 time period (ST326), to keep the vane 202 to position at the target position.

Waveforms of actual and target behavior of the actuator vane will be described with reference to the attached drawings.

Figure 6:
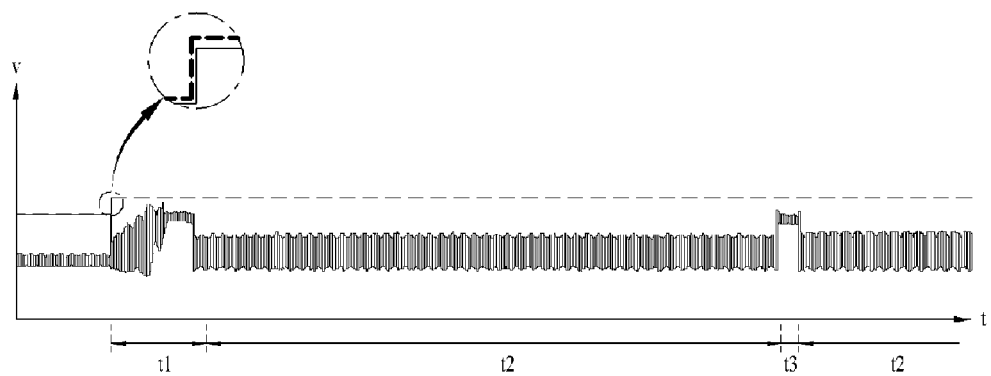
FIG. 6 illustrates a graph showing an actual voltage versus a current waveform of an electronic actuator in a turbocharger in accordance with a preferred embodiment of the present invention.

In FIG. 6, an X-axis denotes time and a Y-axis denotes a current, a thick solid line denotes a locus of a target position of the vane, and a thin solid line denotes a locus of an actual position of the vane, one square eye denotes 10 seconds such that a total time period of the X-axis is 100 seconds corresponding to 10 square eyes.

Referring to FIGS. 5 and 6, as the turbocharger is driven, a target moving locus of the vane 202 is controlled to follow an actual locus of the vane 202 by the microcomputer 210.

Though the drawing shows as if the target moving locus of the vane 202 overlaps with the actual moving locus, if an enlarged drawing is referred, it can be known that there is a minute difference between the target moving locus and the actual moving locus, though the target moving locus is close to the actual moving locus.

It can be known that, if the microcomputer 210 forwards the PWM signal to the motor through the electronic control unit 100 so that the target moving locus is the same with the actual moving locus, an increased current waveform is shown as the motor is operated for the t1 time period.

After the t1 time period, the microcomputer 210 applies a current to the motor for the t2 time period with a decreased current for making the vane 202 so that no overcurrent is applied to the motor.

After the t2 time period, the microcomputer 210 drives the motor additionally for the t3 time period with an increased current for making the vane 202 to position at the target position.

Since the t3 time period is a time period shorter than the t1 time period, the microcomputer 210 controls such that the vane 202 reaches to the target position while the motor is operated for the t3 time period.

Thereafter, the microcomputer 210 receives information on a position of the vane 202, and decreases the current being applied to the motor for a t2' time period for preventing the motor from being applied with the overcurrent, and keeps motor control for the position of the vane 202 by means of the position sensor 240.

As has been described, the actuator in a turbocharger of a vehicle and method for controlling the same of the present invention has the following advantages.

The prevention of malfunction of the vane of the turbocharger permits stable operation of the diesel engine.

The prevention of burning or damage of the actuator connected to the vane of the turbocharger improves a lifetime and economy of the product.

The improvement of reliability of the vehicle enhances satisfaction of consumers.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electronic actuator in a turbocharger of a vehicle comprising:
   an electronic control unit provided to the vehicle;
   a microcomputer for controlling operation of a vane of the turbocharger according to a PWM (Pulse Width Modulation) signal from the electronic control unit; and
   an actuator unit having a motor of which operation is controlled by the PWM signal from the microcomputer,
   wherein the microcomputer forwards PWM signals different from one another to the motor for controlling an overcurrent;
   wherein the electronic control unit performs a signal control step including a step of following up the present position of the vane and applying a current corresponding to a target signal to the motor,
   wherein the signal control includes a first control step including a step of applying an increased current to the motor during a t1 time period by increasing a duty ratio of the PWM signal when the vane fails to position at the target position,
   wherein the signal control step includes an overcurrent control step for controlling an overcurrent to prevent the overcurrent from being applied to the motor,
   wherein the overcurrent control step includes:
      a second control step for decreasing a current being applied to the motor during a t2 time period by decreasing the duty ratio of the PWM signal when the t1 time period is passed, and
      a third control step for increasing the current being applied to the motor during a t3 time period by increasing the duty ratio of the PWM signal when the t2 time period is passed,
      wherein the t1 time period is a predetermined time period required for the vane to follow up the target position, the t2 time period is a predetermined time period required to cool down the motor.

2. The electronic actuator as claimed in claim 1, wherein the microcomputer includes;
   a variable duty control unit for varying the PWM signal and forwarding the PWM signal varied thus to the motor unit, and
   a fixed duty control unit for forwarding the PWM signal fixed with respect to time.

3. The electronic actuator as claimed in claim 1, wherein the actuator unit includes a position sensor for sensing a position of the vane.

4. A method for controlling an electronic actuator in a turbocharger of a vehicle comprising the steps of:
   a target signal forwarding step for an electronic control unit to forward a PWM (Pulse Width Modulation) signal on a target position of a vane for making the vane of the actuator in the turbocharger to position to the target position;
   a vane position determining step for determining whether the vane is positioned at the target position or not at a present time; and
   a signal control step for determining that a present state is a normal state if the vane is positioned at the target position, and if the vane fails to position at the target position, controlling the PWM signal being forwarded to a motor according to time;
   wherein the actuator includes the motor that is connected to the vane,
   wherein the signal control step includes a step of following up the present position of the vane and applying a current corresponding to a target signal to the motor,
   wherein the signal control step includes a first control step including a step of applying an increased current to the motor during a t1 time period by increasing a duty ratio of the PWM signal when the vane fails to position at the target position,
   wherein the signal control step includes an overcurrent control step for controlling an overcurrent to prevent the overcurrent from being applied to the motor,
   wherein the overcurrent control step includes:
      a second control step for decreasing a current being applied to the motor during a t2 time period by decreasing the duty ratio of the PWM signal when the t1 time period is passed, and
      a third control step for increasing the current being applied to the motor during a t3 time period by increasing the duty ratio of the PWM signal when the t2 time period is passed,
      wherein the t1 time period is a predetermined time period required for the vane to follow up the target position, the t2 time period is a predetermined time period required to cool down the motor.

5. The method as claimed in claim 4, wherein the current applied in the second control step is decreased from the current applied in the first control step.

6. The method as claimed in claim 4, wherein a current higher than the current applied in the second control step is applied in the third control step.

7. The method as claimed in claim 4, wherein a current fixed with respect to time is applied to the motor in the second control step and the third control step.

8. The method as claimed in claim 4, wherein the second and third control steps are repeated after the first control step in an order only when the vane fails to position at the target position.

9. The method as claimed in claim 4, wherein the current applying time periods in the signal control steps are in an order to $t2 > t1 > t3$,
   wherein t1 means the t1 time period required to perform the first control step,
   t2 means the t2 time period required to perform the second control step, and
   t3 means the t3 time period required to perform the third control step.

* * * * *